United States Patent
Lee et al.

(10) Patent No.: US 9,843,042 B2
(45) Date of Patent: Dec. 12, 2017

(54) CATHODE ACTIVE MATERIAL COMPOSITION AND LITHIUM SECONDARY BATTERY INCLUDING THE SAME

(71) Applicant: LG Chem, Ltd., Seoul (KR)

(72) Inventors: Hyeok Moo Lee, Daejeon (KR); Song Taek Oh, Daejeon (KR); Jung Seok Choi, Daejeon (KR); Ji Hye Park, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/197,411

(22) Filed: Mar. 5, 2014

(65) Prior Publication Data
US 2014/0183407 A1    Jul. 3, 2014

Related U.S. Application Data

(63) Continuation of application No. PCT/KR2013/010519, filed on Nov. 19, 2013.

(30) Foreign Application Priority Data

Nov. 19, 2012   (KR) .................. 10-2012-0131006

(51) Int. Cl.
*H01M 4/485* (2010.01)
*H01M 4/62* (2006.01)
(Continued)

(52) U.S. Cl.
CPC .......... *H01M 4/485* (2013.01); *H01M 4/131* (2013.01); *H01M 4/622* (2013.01); *H01M 4/624* (2013.01);
(Continued)

(58) Field of Classification Search
CPC ........ Y02E 60/12; Y02E 60/122; H01M 4/56; H01M 4/131; H01M 4/624; C01D 15/02
(Continued)

(56) References Cited

U.S. PATENT DOCUMENTS

| 5,512,386 A | 4/1996 | Simon |
| 6,280,879 B1 | 8/2001 | Andersen et al. |

(Continued)

FOREIGN PATENT DOCUMENTS

| CN | 102064313 A | 5/2011 |
| CN | 102751502 A | 10/2012 |

(Continued)

*Primary Examiner* — Peter F Godenschwager
*Assistant Examiner* — Andrew J. Oyer
(74) *Attorney, Agent, or Firm* — Lerner, David, Littenberg, Krumholz & Mentlik, LLP

(57) ABSTRACT

Provided are a cathode active material composition including an $xLi_2MO_3 \cdot (1-x)LiMeO_2$ composite (where $0<x<1$, and M and Me represent metal ions and may be the same or different from each other) and a conductive polymer material, and a secondary battery including the cathode active material composition in a cathode. Since the conductivity of the secondary battery of the present invention may be improved, the cathode active material composition may improve life characteristics, output characteristics, and rate capability of the secondary battery.

4 Claims, 1 Drawing Sheet

(51) Int. Cl.
*H01M 4/131* (2010.01)
*H01M 4/505* (2010.01)
*H01M 10/052* (2010.01)
*H01M 4/525* (2010.01)

(52) U.S. Cl.
CPC ............ *H01M 4/505* (2013.01); *H01M 4/525* (2013.01); *H01M 10/052* (2013.01)

(58) Field of Classification Search
USPC ................................ 252/182.1; 429/211, 233
See application file for complete search history.

(56) References Cited

U.S. PATENT DOCUMENTS

| 7,468,223 B2* | 12/2008 | Thackeray et al. ........ 429/231.1 |
| 7,651,647 B1* | 1/2010 | Strange et al. ............... 264/104 |
| 2002/0136954 A1* | 9/2002 | Thackeray et al. ........ 429/231.1 |
| 2003/0175588 A1 | 9/2003 | Zhang |
| 2004/0018430 A1 | 1/2004 | Holman et al. |
| 2005/0026040 A1 | 2/2005 | Thackeray et al. |
| 2006/0099508 A1 | 5/2006 | Thackeray et al. |
| 2007/0082261 A1* | 4/2007 | Lee ............................... 429/144 |
| 2009/0075165 A1 | 3/2009 | Park et al. |
| 2010/0233546 A1 | 9/2010 | Nesper et al. |
| 2011/0143020 A1 | 6/2011 | Park et al. |
| 2012/0282521 A1 | 11/2012 | Choi et al. |

FOREIGN PATENT DOCUMENTS

| JP | 2009-009753 A | 1/2009 |
| JP | 2009-076446 A | 4/2009 |
| JP | 2011-100594 A | 5/2011 |
| KR | 2001-0019511 A | 3/2001 |
| KR | 20090030087 A | 3/2009 |
| KR | 20120124779 A | 11/2012 |

* cited by examiner

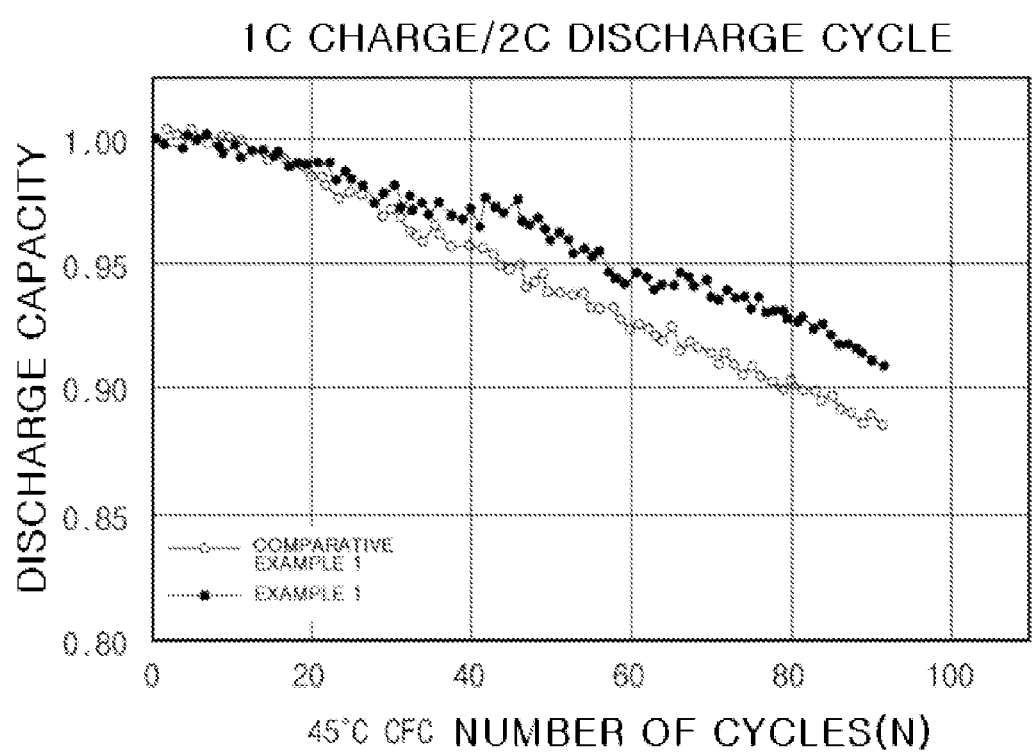

CATHODE ACTIVE MATERIAL COMPOSITION AND LITHIUM SECONDARY BATTERY INCLUDING THE SAME

CROSS-REFERENCE TO RELATED APPLICATIONS

The present application is a continuation of International Application No. PCT/KR2013/010519 filed on Nov. 19, 2013, which claims the benefit of Korean Patent Application No. 10-2012-0131006, filed on Nov. 19, 2012, the disclosures of which are incorporated herein by reference.

TECHNICAL FIELD

The present invention relates to a cathode active material composition including a lithium metal composite (Chemical Formula 1) and a conductive polymer material, and a lithium secondary battery including the cathode active material composition in a cathode.

BACKGROUND ART

Demand for secondary batteries as an energy source has been significantly increased as technology development and demand with respect to mobile devices have increased. Among these secondary batteries, lithium secondary batteries having high energy density and high voltage have become commercialized and widely used. A lithium secondary battery generally uses a lithium transition metal oxide as a cathode active material and a graphite-based material as an anode active material.

$LiCoO_2$ has been used as a typical cathode active material of the lithium secondary battery. However, $LiCoO_2$ has many limitations in that it is relatively expensive, the amount of charge and discharge current is low at about 150 mAh/g, its crystal structure is unstable at a voltage of 4.3 V or more, and it has the risk of fire by causing a reaction with an electrolyte solution. Furthermore, $LiCoO_2$ may exhibit very large changes in physical properties even if some parameters are changed during a manufacturing process. In particular, cycle characteristics at high potential and high-temperature storage characteristics tend to be significantly changed due to some changes in the process parameters.

In relation to the foregoing, a technique of coating an outer surface of $LiCoO_2$ with a metal (aluminum etc.) in order to be operable at high potential, or a technique of heat treating $LiCoO_2$ or mixing $LiCoO_2$ with other materials has also been suggested. However, secondary batteries composed of such cathode materials may exhibit poor safety or may not be suitable for mass production.

In addition, transition metal compounds, such as $LiNiO_2$, $LiMn_2O_4$, $LiFePO_4$, $LiNi_xCo_{x-1}O_2$ (where x=1, 2), and $LiNi_{1-x-y}Co_xMn_yO_2$ (where 0≤x≤0.5, 0≤y≤0.5), are used as a cathode active material for a lithium battery. Also, a composite-based oxide including an excessive amount of lithium has been suggested as an alternative as high capacity tends to be required.

However, with respect to the composite-based oxide including an excessive amount of lithium, since the electrical conductivity decreases due to local structural changes in the excessive amount of the cathode active material which occur in an activation operation, rate capability may decrease. Therefore, there is a need to address limitations in the conductivity in order to efficiently use the composite-based oxide as an active material.

DISCLOSURE OF THE INVENTION

Technical Problem

The present invention provides a cathode active material composition which may improve lifetime, output characteristics, and rate capability by improving conductivity, and a lithium secondary battery including the cathode active material composition in a cathode.

Technical Solution

According to an aspect of the present invention, there is provided a cathode active material composition including:
i) a composite of Chemical Formula 1,

$$xLi_2MO_3 \cdot (1-x)LiMeO_2 \qquad \text{<Chemical Formula 1>}$$

where 0<x<1, and M and Me represent metal ions and are same or different from each other;
ii) a conductive polymer material; and
iii) a binder.

According to another aspect of the present invention, there is provided a lithium secondary battery including the cathode active material composition in a cathode.

Advantageous Effects

Since a cathode active material composition of the present invention includes a composite of Chemical Formula 1 and a conductive polymer material having excellent conductivity, the cathode active material composition may improve conductivity while maintaining high capacity. In particular, the cathode active material composition may improve life characteristics, output characteristics, and rate capability by improving high voltage stability.

BRIEF DESCRIPTION OF THE DRAWINGS

FIG. 1 is a graph illustrating discharge capacity characteristics of lithium secondary batteries of Example 1 and Comparative Example 1 according to an embodiment of the present invention.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A cathode active material composition of the present invention may include a cathode active material of Chemical Formula 1; a conductive polymer material; and a binder:

$$xLi_2MO_3 \cdot (1-x)LiMeO_2 \qquad \text{<Chemical Formula 1>}$$

where 0<x<1, and M and Me represent metal ions and may be the same or different from each other.

According to an embodiment of the present invention, since conductivity may be improved by using the composite of Chemical Formula 1 as a cathode active material and the conductive polymer material, lifetime, output characteristics, and rate capability of a lithium battery may be improved.

In an embodiment of the present invention, the composite of Chemical Formula 1, as a high capacity-based material, may represent the same layered structure as $Li_2MO_3$ and $LiMeO_2$ and may exist in the form in which an excessive amount of lithium is substituted into a transition metal layer, according to a typical method known in the art.

In the composite of Chemical Formula 1, x defines a molar ratio between two components, $Li_2MO_3$ and $LiMeO_2$. A value of x may be in a range greater than 0 and less than 1, and preferably, may be in a range of 0.1 or more to 0.5 or less.

Also, Me may include at least one or more elements selected from the group consisting of nickel (Ni), cobalt (Co), manganese (Mn), chromium (Cr), iron (Fe), vanadium (V), aluminum (Al), magnesium (Mg), and titanium (Ti). M may include at least one or more elements selected from the group consisting of Mn, Ti, and zirconium (Zr), and for example, M may be Mn.

According to an embodiment of the present invention, an amount of the composite of Chemical Formula 1 is in a range of 60 wt % to 97 wt %, preferably in a range of 90 wt % to 97 wt %, and more preferably in a range of 90 wt % to 95 wt % based on a total weight of the cathode active material composition.

The composite of Chemical Formula 1 used as the cathode active material according to the embodiment of the present invention may be prepared by a method typically used in the art. For example, the composite of Chemical Formula 1 may be prepared by a combustion synthesis method. A starting material having the form of a metal salt, for example, carbonate or acetate, is dissolved in an acidic aqueous solution to form a sol, and a gel obtained by evaporating moisture is combusted. Then, a targeted composite of Chemical Formula 1 may be formed in a powder form by an additional heat treatment.

As another method, the composite of Chemical Formula 1 may be prepared by a hydrothermal process under basic conditions using LiOH and/or KOH. The above process may be performed for 6 hours to 12 hours in a pressurized autoclave having a pressure condition of, for example, 5 atm to 35 atm and a temperature range of 100° C. to 150° C.

The above-described composite of Chemical Formula 1 may exhibit a high capacity of 240 mAh/g to 250 mAh/g or more, and an activation operation by charging at a high voltage of 4.35 V or more may be necessary in order to exhibit the above capacity. That is, lithium is initially deintercalated by an oxidation reaction of oxygen at the high voltage and, from a subsequent discharge reaction, a reversible reaction may proceed by using a redox reaction of a metal included in the composite, for example, manganese.

However, the conductivity of the composite of Chemical Formula 1 may be reduced due to local structural changes during the activation operation. For this, in the present invention, a conductive polymer material having excellent conductivity characteristics is added to the cathode active material composition. Eventually, in the present invention, the conductive polymer material is used to address limitations of the composite of Chemical Formula 1, and this may exhibit better effects than a typical conductive agent.

The conductive polymer material according to an embodiment of the present invention is any one selected from the group consisting of poly(3,4-ethylenedioxythiophene)-poly (styrenesulfonate) (PEDOT:PSS), polyaniline, and polypyrrole, or a mixture of two or more thereof, and may be PEDOT:PSS.

Herein, since PEDOT:PSS exists as an aqueous solution, PEDOT:PSS may be easily used without the addition of a separate solution during the preparation of an electrode. In terms of the electrical conductivity, PEDOT relates to the movement of positive charges and PSS relates to the movement of negative charges. PEDOT:PSS exhibits higher conductivity, for example, about 1,000 S/cm, than other conductive polymers, and thus, may help to improve the conductivity.

According to an embodiment of the present invention, an amount of the conductive polymer material is in a range of 0.5 wt % to 5 wt %, preferably in a range of 0.5 wt % to 3 wt %, and more preferably in a range of 0.7 wt % to 1 wt % based on the total weight of the cathode active material composition. In the case that the amount of the conductive polymer material used is less than 0.5 wt %, it may not improve the conductivity, and thus, an improvement of the life characteristics of the battery may be difficult. In the case in which the amount of the conductive polymer material is greater than 5 wt %, limitations may occur during the preparation of a cathode slurry in an electrode formation process.

The binder used in the present invention may be any one selected from the group consisting of a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), and a fluorine rubber, or a mixture of two or more thereof. The content of the binder may be an amount typically used in a lithium secondary battery.

The cathode active material composition of the present invention may selectively include other additives known in the art as well as a conductive agent in addition to the components described above. The conductive agent may include carbon black.

Electrodes of a lithium secondary battery of the present invention may include a cathode, an anode, a separator, and a non-aqueous electrolyte, and may be prepared by a typical method known in the art.

The cathode, for example, may be prepared by coating an aluminum current collector with the cathode active material composition of the present invention, and pressing and drying the coated aluminum current collector.

In the anode, a carbon material, lithium metal, silicon, or tin, which may intercalate and deintercalate lithium ions, may be typically used as an anode active material. For example, the carbon material may be used and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Similar to the cathode, any binder may be used as a binder used in the anode so long as it is typically used in the art. An anode active material composition is prepared by mixing and stirring the anode active material and the additives. Then, the anode may be prepared by coating a current collector with the anode active material composition and pressing the coated current collector.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used. However, the separator is not limited thereto.

The secondary battery of the present invention has a charge voltage of 4.35 V or more and may be a lithium secondary battery. A shape of the lithium secondary battery is not particularly limited, and for example, a cylindrical type using a can, a prismatic type, a pouch type, or a coin type may be used.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

EXAMPLES

Hereinafter, the present invention will be described in more detail, according to examples and experimental examples. However, the present invention is not limited thereto.

Example 1

Cathode Active Material Composition Preparation

A cathode active material composition was prepared by mixing 90.6 wt % of $0.1Li_2MnO_3.0.9LiNi_{0.33}Co_{0.33}Mn_{0.33}O_2$ as a cathode active material, 4.4 wt % of carbon black as a conductive agent, 4.1 wt % of polyvinylidene fluoride as a binder, and 0.9 wt % of PEDOT:PSS as a conductive polymer material in an N-methylpyrrolidone (NMP) solvent.

Cathode Preparation

An about 20 μm thick Al thin film, as a cathode current collector, was coated with the cathode active material composition and dried. Then, a cathode was prepared by roll-pressing the dried current collector.

Anode Preparation

An anode mixture slurry was prepare by adding 96 wt % of carbon powder as an anode active material, 3 wt % of polyvinylidene fluoride (PVdF) as a binder, and 1 wt % of carbon black as a conductive agent to NMP as a solvent. An about 10 μm thick copper (Cu) thin film, as an anode current collector, was coated with the anode mixture slurry and dried. Then, an anode was prepared by roll-pressing the dried current collector.

Lithium Secondary Battery Preparation

Ethylene carbonate (EC) and diethyl carbonate (DEC) were mixed at a volume ratio of 30:70, and $LiPF_6$ was added to the non-aqueous electrolyte solvent thus prepared to prepare a 1 M $LiPF_6$ non-aqueous electrolyte solution.

Also, a polyolefin separator was disposed between the cathode and the anode, and a lithium secondary battery was then prepared by injecting the electrolyte solution.

Comparative Example 1

A lithium secondary battery was prepared in the same manner as in Example 1 except that PEDOT:PSS as a conductive polymer material was not added in comparison to the cathode active material composition of Example 1.

Experimental Example

<High-Temperature Cycle Characteristics>

The lithium secondary batteries (battery capacity: 3.4 mAh) prepared in Example 1 and Comparative Example 1 were charged at a constant current (CC) of 1 C to a voltage of 4.35 V at 45° C., and thereafter, charge in the first cycle was performed by charging the lithium secondary batteries at a constant voltage (CV) of 4.35 V to a current of 0.17 mAh. After the batteries were left standing for 10 minutes, discharge capacities in the first cycle were measured by discharging the batteries at a constant current of 2 C to a voltage of 2.5 V. Subsequently, with respect to each battery of Example 1 and Comparative Example 1, the charge and discharge were repeated 90 cycles to measure discharge capacity for each cycle. The results thereof are presented in FIG. 1.

As illustrated in FIG. 1, Example 1 including the conductive polymer material of the present invention exhibited better discharge characteristics than Comparative Example 1, in which the conductive polymer material was not added, after a 20$^{th}$ cycle. Also, a difference between the discharge characteristics of Example 1 and Comparative Example 1 was further increased as the number of cycles was increased.

Accordingly, it may be understood that the conductivity of the secondary battery of the present invention was improved and thus, the cycle characteristics thereof were excellent even at a high charge voltage of 4.35 V.

INDUSTRIAL APPLICABILITY

Since a cathode active material composition according to an embodiment of the present invention may improve conductivity while maintaining high capacity and may particularly improve high voltage stability by including a composite of Chemical Formula 1 and a conductive polymer material having excellent conductivity, the life characteristics, output characteristics, and rate capability of a battery may be further improved. Thus, the cathode active material composition may be suitable for secondary batteries.

The invention claimed is:
1. A lithium secondary battery comprising a cathode active material composition comprising:
   i) a composite of Chemical Formula 1,

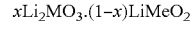

$xLi_2MO_3.(1-x)LiMeO_2$                 <Chemical Formula 1> where 0.1<x<0.5, 0<a, b, c<1 and a+b+c=1;
   ii) a conductive polymer material being poly(3,4-ethylenedioxythiophene)-poly(styrenesulfonate)(PEDOT:PSS);
   iii) a binder; and
   iv) a conductive agent,
   wherein the conductive polymer material is present in an amount of 0.9 wt % to 3 wt % based on a total weight of the cathode active material composition,
   wherein the composite of Chemical Formula 1 is present in an amount of 90 wt % to 95 wt % based on a total weight of the cathode active material composition, and
   wherein the conductive agent is carbon black.

2. The lithium secondary battery of claim 1, wherein the binder is one or more selected from the group consisting of polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), and a fluorine rubber.

3. A lithium secondary battery comprising a cathode including a cathode active material composition, an anode including an anode active material composition, and a separator provided between the cathode and anode,
wherein the cathode active material composition comprises:
i) a composite of Chemical Formula 1, $x\text{Li}_2\text{MO}_3 \cdot (1-x)\text{LiMeO}_2$ <Chemical Formula 1> where $0.1 \leq x \leq 0.5$, $0 < a, b, c < 1$ and $a+b+c=1$;
ii) a conductive polymer material being poly(3,4-ethylenedioxythiophene)-poly(styrenesulfonate)(PEDOT:PSS);

iii) a binder being one or more selected from the group consisting of a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), and a fluorine rubber; and
iv) a conductive agent being carbon black,
wherein the composite of Chemical Formula 1 is present in an amount of 90 wt % to 95 wt % based on a total weight of the cathode active material composition, and
the conductive polymer material is present in an amount of 0.9 wt % to 3 wt % based on a total weight of the cathode active material composition.

4. The lithium secondary battery of claim 1, wherein the lithium secondary battery has a charge voltage of 4.35 V or more.

* * * * *